(12) United States Patent
Oya et al.

(10) Patent No.: US 10,797,331 B2
(45) Date of Patent: Oct. 6, 2020

(54) FUEL CELL SYSTEM AND DETERMINATION METHOD INCLUDING INJECTOR FAILURE DETERMINATION BASED ON CIRCULATION HYDROGEN PUMP POWER CONSUMPTION

(71) Applicant: TOYOTA JIDOSHA KABUSHIKI KAISHA, Toyota-Shi, Aichi-Ken (JP)

(72) Inventors: Kaori Oya, Toyota (JP); Masahiro Okuyoshi, Okazaki (JP); Tetsuya Bono, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 113 days.

(21) Appl. No.: 15/914,149

(22) Filed: Mar. 7, 2018

(65) Prior Publication Data

US 2018/0261859 A1  Sep. 13, 2018

(30) Foreign Application Priority Data

Mar. 9, 2017 (JP) ................. 2017-044822

(51) Int. Cl.
| | |
|---|---|
| *H01M 8/04664* | (2016.01) |
| *H01M 8/04082* | (2016.01) |
| *H01M 8/0438* | (2016.01) |
| *H01M 8/04746* | (2016.01) |
| *H01M 8/1018* | (2016.01) |
| *H01M 8/04537* | (2016.01) |

(52) U.S. Cl.
CPC ... *H01M 8/04686* (2013.01); *H01M 8/04201* (2013.01); *H01M 8/04388* (2013.01); *H01M 8/04626* (2013.01); *H01M 8/04753* (2013.01); *H01M 8/1018* (2013.01); *H01M 2008/1095* (2013.01); *H01M 2250/20* (2013.01); *Y02E 60/521* (2013.01); *Y02T 90/32* (2013.01)

(58) Field of Classification Search
CPC ......... H01M 8/04686; H01M 8/04201; H01M 8/04388; H01M 8/04626; H01M 8/04753; H01M 8/1018
USPC ......................................... 429/415, 44, 444
See application file for complete search history.

(56) References Cited

U.S. PATENT DOCUMENTS

| | | | |
|---|---|---|---|
| 2003/0226399 A1 | 12/2003 | Clingerman et al. | |
| 2009/0029226 A1* | 1/2009 | Yamagishi | H01M 8/04082 429/414 |
| 2009/0081492 A1* | 3/2009 | Hasuka | H01M 8/04089 429/429 |
| 2009/0130510 A1* | 5/2009 | Ishikawa | H01M 8/04089 429/411 |

(Continued)

FOREIGN PATENT DOCUMENTS

| | | |
|---|---|---|
| JP | 2004-0259670 A | 9/2004 |
| JP | 2005-529463 A | 9/2005 |

(Continued)

*Primary Examiner* — Sean P Cullen
(74) *Attorney, Agent, or Firm* — Finnegan, Henderson, Farabow, Garrett & Dunner, LLP (57) ABSTRACT

A fuel cell system determines whether or not the injector is failed using a determination result, the determination result showing whether or not a fluctuation range determined for power consumed by a hydrogen pump is a predetermined value or less, the fluctuation range being generated by opening and closing of the injector.

6 Claims, 9 Drawing Sheets

(56) References Cited

U.S. PATENT DOCUMENTS

| | | | | |
|---|---|---|---|---|
| 2009/0233132 A1* | 9/2009 | Hasuka | ............ | H01M 8/04089 |
| | | | | 429/415 |
| 2009/0252997 A1* | 10/2009 | Katano | ................ | F02D 33/006 |
| | | | | 429/414 |
| 2009/0253008 A1* | 10/2009 | Ishikawa | ........... | H01M 8/04089 |
| | | | | 429/429 |
| 2010/0040922 A1* | 2/2010 | Katano | ............... | F16K 31/0651 |
| | | | | 429/423 |
| 2010/0098980 A1* | 4/2010 | Ishikawa | ........... | H01M 8/04089 |
| | | | | 429/429 |
| 2010/0104905 A1* | 4/2010 | Ishikawa | ........... | H01M 8/04089 |
| | | | | 429/445 |
| 2010/0233581 A1* | 9/2010 | Katano | ............ | H01M 8/04089 |
| | | | | 429/513 |
| 2010/0248062 A1* | 9/2010 | Ishikawa | ........... | H01M 8/04328 |
| | | | | 429/444 |
| 2010/0255397 A1* | 10/2010 | Ishikawa | ........... | H01M 8/04097 |
| | | | | 429/444 |
| 2010/0273081 A1* | 10/2010 | Ishikawa | ........... | H01M 8/04089 |
| | | | | 429/443 |

FOREIGN PATENT DOCUMENTS

| | | | | |
|---|---|---|---|---|
| JP | 2007280800 | A | * | 10/2007 |
| JP | 2008-053122 | A | | 3/2008 |
| JP | 2008130442 | A | * | 6/2008 |
| JP | 2011028950 | A | * | 2/2011 |
| JP | 2014-002939 | A | | 1/2014 |

\* cited by examiner

| No. | MEASUREMENT RESULT | | | DETERMINATION RESULT |
| --- | --- | --- | --- | --- |
| | FLUCTUATION RANGE W FOR POWER CONSUMED BY HYDROGEN PUMP | FLUCTUATION RANGE P1 FOR PRESSURE MEASURED BY FIRST PRESSURE SENSOR | FLUCTUATION RANGE P2 FOR PRESSURE MEASURED BY SECOND PRESSURE SENSOR | |
| 1 | NORMAL | NORMAL | NORMAL | NORMAL |
| 2 | NORMAL | NORMAL | ABNORMAL | NORMAL |
| 3 | NORMAL | ABNORMAL | NORMAL | NORMAL |
| 4 | NORMAL | ABNORMAL | ABNORMAL | ABNORMAL |
| 5 | ABNORMAL | NORMAL | NORMAL | NORMAL |
| 6 | ABNORMAL | NORMAL | ABNORMAL | ABNORMAL |
| 7 | ABNORMAL | ABNORMAL | NORMAL | ABNORMAL |
| 8 | ABNORMAL | ABNORMAL | ABNORMAL | ABNORMAL |

| | | | A | B | C | D | E | F | G |
|---|---|---|---|---|---|---|---|---|---|
| | | FAILURE PATTERN | A | B | C | D | E | F | G |
| DETERMINATION RESULT | | THE NUMBER OF FAILED DEVICES | 0 | 1 | 3 | 1 | 3 | 2 | 2 |
| | | HYDROGEN PUMP | N | N | AN | N | AN | N | AN |
| | | FIRST PRESSURE SENSOR | N | N | AN | AN | N | AN | N |
| | | SECOND PRESSURE SENSOR | N | AN | N | N | AN | AN | N |
| | | FIRST INJECTOR | N | N | AN | N | AN | N | AN |
| | | SECOND INJECTOR | N | N | N | N | N | N | N |
| | | THIRD INJECTOR | N | N | N | N | N | N | N |
| INDICATION OF OUTPUT | | | NORMAL | PATTERN B | | PATTERN D | | PATTERN F AND PATTERN G | |

| | | | No. 9 | No. 10 | No. 11 | No. 12 |
|---|---|---|---|---|---|---|
| MEASUREMENT RESULT | FIRST INJECTOR | W | N | N | N | N |
| | | P1 | N | N | AN | AN |
| | | P2 | N | AN | N | AN |
| | SECOND INJECTOR | W | N | N | N | N |
| | | P1 | N | N | N | N |
| | | P2 | N | N | N | N |
| | THIRD INJECTOR | W | N | N | N | N |
| | | P1 | N | N | N | N |
| | | P2 | N | N | N | N |

N: NORMAL   AN: ABNORMAL

FUEL CELL SYSTEM AND DETERMINATION METHOD INCLUDING INJECTOR FAILURE DETERMINATION BASED ON CIRCULATION HYDROGEN PUMP POWER CONSUMPTION

CROSS-REFERENCE TO RELATED APPLICATION

This application claims priority to Japanese Patent Application No. 2017-44822 filed on Mar. 9, 2017, the entire contents of which are incorporated by reference herein.

BACKGROUND

Field

The present disclosure relates to a fuel cell system and a determination method.

Related Art

A fuel cell system with a fuel cell stack has conventionally been known (for example, JP 2014-002939 A). The fuel cell system of JP 2014-002939 A includes a sensor for measuring an oxygen concentration to detect a failure in a circulation pump for a cathode. The oxygen concentration obtained from the sensor is used for detecting a failure in the circulation pump.

However, providing a sensor dedicated to detection of a failure in a particular device could lead to increase in manufacturing cost for a fuel cell system.

SUMMARY

The present disclosure has been made to solve the above-described problem and is feasible as the following aspect(s).

According to one aspect of the present disclosure, a fuel cell system is provided. The fuel cell system comprises: a hydrogen gas supply flow path configured to supply hydrogen gas to the fuel cell stack; a hydrogen gas discharge flow path configured to discharge the hydrogen gas from the fuel cell stack; a hydrogen gas circulation flow path configured to communicate the hydrogen gas supply flow path and the hydrogen gas discharge flow path with each other; an injector provided in the hydrogen gas supply flow path at an upstream of a connection between the hydrogen gas supply flow path and the hydrogen gas circulation flow path; a hydrogen pump provided in the hydrogen gas circulation flow path; a consumed power acquiring part configured to acquire a consumed power consumed by the hydrogen pump; and a controller configured to control at least the injector and the hydrogen pump. The controller is further configured to determine whether or not a fluctuation range of the consumed power of the hydrogen pump caused by opening and closing of the injector is a predetermined value or less, and to determine whether or not the injector is failed using a determination result regarding the fluctuation range. According to the fuel cell system of this aspect, using the fluctuation range determined for power consumed by the hydrogen pump makes it possible to make a determination about a failure in the injector without the need of providing an additional sensor dedicated to detection of a failure in the injector.

DESCRIPTION OF THE EMBODIMENTS

A. First Embodiment

A1. Fuel Cell System

Figure 1:
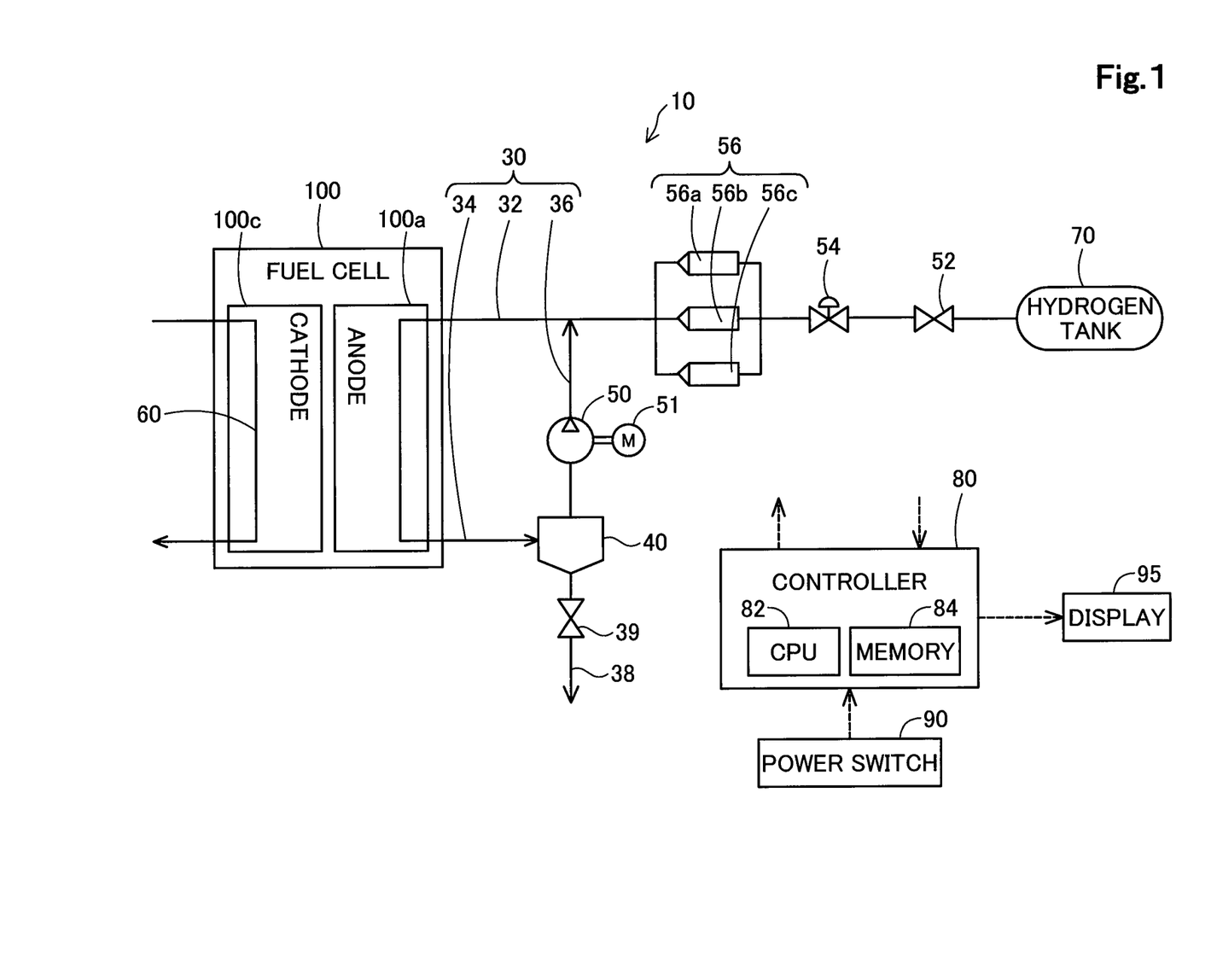
FIG. 1 is a schematic view showing a fuel cell system according to a first embodiment of the present disclosure.

FIG. 1 is a schematic view showing a fuel cell system 10 according to a first embodiment of the present disclosure. The fuel cell system 10 is usable in a fuel cell vehicle, for example. In this embodiment, the fuel cell system 10 includes a fuel cell stack (hereinafter simply called a "fuel cell") 100, an air flow path 60, a hydrogen gas flow path 30, an injector 56, a hydrogen pump 50, a gas-liquid separator 40, a power switch 90, a display 95, and a controller 80.

The fuel cell 100 is a polymer electrolyte fuel cell that generates power in response to supply of hydrogen gas as fuel gas and oxygen as oxidizing gas. Oxygen is supplied to a cathode 100c of the fuel cell 100 through the air flow path 60. The supplied oxygen is used for electrochemical reaction. Oxygen not having been used for the electrochemical reaction is released as off-gas to the outside of the fuel cell 100. Hydrogen gas is supplied from a hydrogen tank 70, passes through the hydrogen gas flow path 30, and is then supplied to an anode 100a of the fuel cell 100. The supplied hydrogen gas is used for electrochemical reaction. Hydrogen gas not having been used for the electrochemical reaction is released as off-gas to the outside of the fuel cell 100.

The hydrogen gas flow path 30 is a flow path for supply of hydrogen gas to the fuel cell 100 and discharge of hydrogen gas from the fuel cell 100. The hydrogen gas flow path 30 includes a hydrogen gas supply flow path 32 for supply of hydrogen gas to the fuel cell 100, a hydrogen gas discharge flow path 34 for discharge of hydrogen gas from the fuel cell 100, and a hydrogen gas circulation flow path 36 communicating the hydrogen gas supply flow path 32 and the hydrogen gas discharge flow path 34 with each other.

The hydrogen gas supply flow path 32 is connected to the hydrogen tank 70. The hydrogen gas supply flow path 32 is provided with the following elements arranged in order of increasing distance from a most upstream position, specifically, in order of increasing distance from the hydrogen tank 70: an on-off valve 52, a regulator 54, and the injector 56.

The inside of the hydrogen tank 70 is filled with hydrogen gas. Hydrogen gas is supplied to the anode 100a of the fuel cell 100 through the hydrogen gas supply flow path 32. The on-off valve 52 is opened and closed to control flow of hydrogen gas from the hydrogen tank 70 into a place upstream from the injector 56. When the fuel cell 100 is stopped, the on-off valve 52 is closed. The regulator 54 is a pressure reducing valve for adjustment of the pressure of hydrogen gas in a place upstream from the injector 56.

The injector 56 is an on-off valve of an electromagnetic drive system having a valve element to be driven electromagnetically. In the hydrogen gas supply flow path 32, the injector 56 is provided upstream from a portion where the hydrogen gas supply flow path 32 communicates with the hydrogen gas circulation flow path 36. The controller 80 controls a cycle of driving the injector 56 and a period of opening the valve of the injector 56, thereby controlling the amount of hydrogen gas to be supplied to the fuel cell 100. In this embodiment, the injector 56 includes three injectors, a first injector 56a, a second injector 56b, and a third injector 56c. However, the number of the injectors 56 may be two or less, or four or more.

The hydrogen gas discharge flow path 34 is connected to the gas-liquid separator 40. The hydrogen gas discharge flow path 34 introduces unreacted gas (hydrogen gas or nitrogen gas, for example) not having been used for electrochemical reaction in the fuel cell 100 into the gas-liquid separator 40.

The gas-liquid separator 40 is connected to the hydrogen gas circulation flow path 36 and drain piping 38. The gas-liquid separator 40 separates gas and liquid from each other discharged from the anode 100a of the fuel cell 100. The gas-liquid separator 40 introduces the discharged gas into the hydrogen gas circulation flow path 36 and introduces the discharged liquid into the drain piping 38.

The drain piping 38 is piping for discharging moisture resulting from separation by the gas-liquid separator 40 to the outside of the fuel cell system 10. The drain piping 38 is provided with a drain valve 39. By opening of the drain valve 39, the moisture is discharged to the outside of the fuel cell system 10.

The hydrogen gas circulation flow path 36 is provided with the hydrogen pump 50. The hydrogen pump 50 feeds gas containing hydrogen gas resulting from separation by the gas-liquid separator 40 to the hydrogen gas supply flow path 32. In this way, hydrogen gas is circulated and then supplied again to the fuel cell 100 in the fuel cell system 10, thereby increasing the efficiency of use of hydrogen. The hydrogen pump 50 is provided with a consumed power acquiring part 51 that acquires power consumed by the hydrogen pump 50. In this embodiment, a power meter is used as the consumed power acquiring part 51.

The controller 80 is configured as a computer including a CPU 82, a memory 84, and an interface circuit to which each of the above-described components is connected. The controller 80 controls at least the injector 56 and the hydrogen pump 50. The controller 80 includes a CPU, a RAM, and a ROM not shown in the drawings used for control over each device. The power switch 90 is a switch to be used by a user in starting and stopping the fuel cell 100. The display 95 is a device for display of failure information about a device in the fuel cell system 10, etc. to be visually recognized by a user. In this embodiment, the display 95 is a liquid crystal display.

A2. Determination Method for Fuel Cell System

Figure 2:
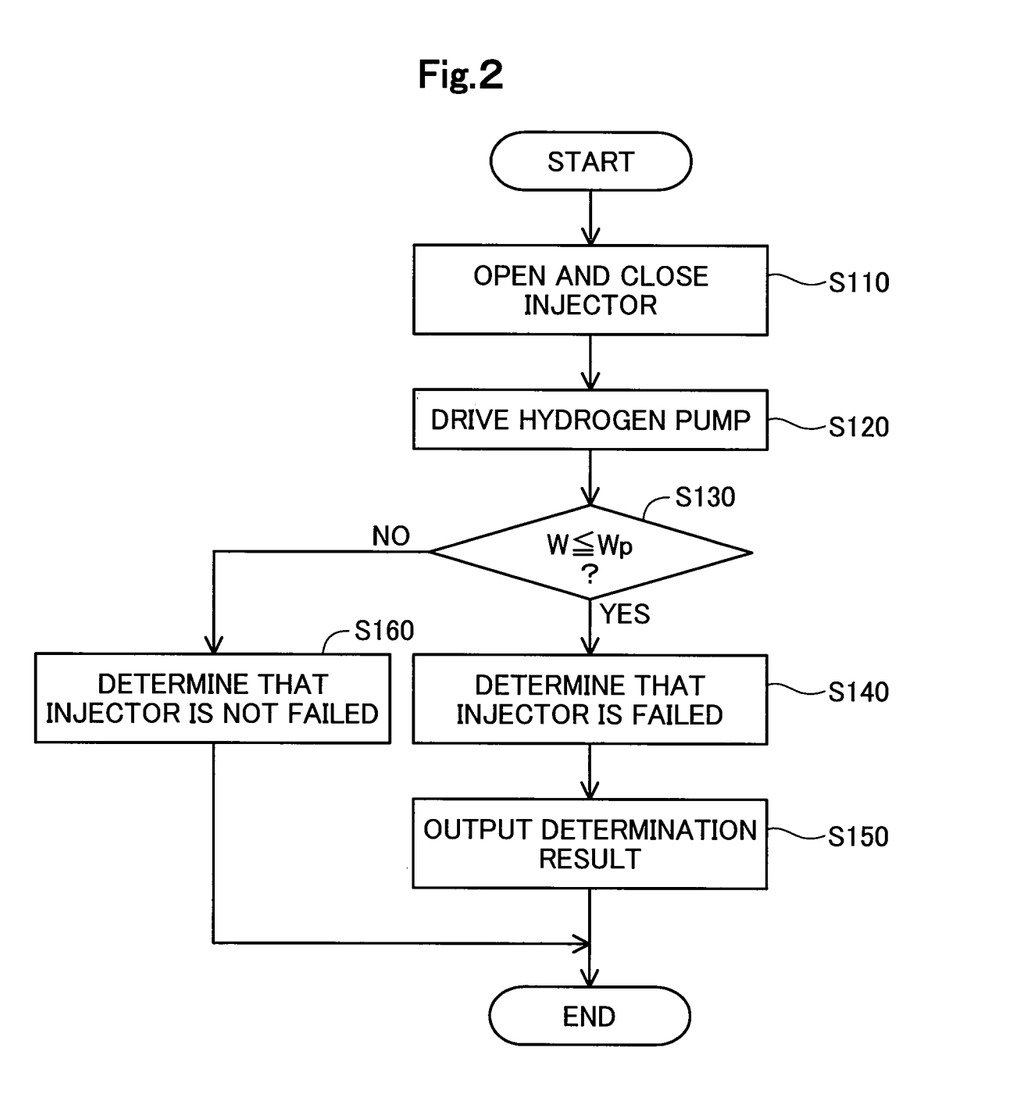
FIG. 2 is a flowchart of determination processing executed by a controller.

FIG. 2 is a flowchart of determination processing executed by the controller 80. The determination processing mentioned herein is executed to determine whether or not the injector 56 is failed. The presence of a failure in the injector 56 mentioned herein means that the injector 56 is not opened even if the controller 80 gives an instruction to open the valve of the injector 56. In this embodiment, the determination processing is executed if a user of the fuel cell system 10 sets the power switch 90 ON.

If the user turns the power switch 90 ON, the controller 80 controls the injector 56 to open and close the injector 56 repeatedly in step S110. Next, in step S120, the controller 80 drives the hydrogen pump 50 to feed hydrogen gas existing between the gas-liquid separator 40 and the hydrogen pump 50 into the hydrogen gas supply flow path 32. Steps S110 and S120 may be executed in reverse order or simultaneously.

Next, in step S130, the controller 80 determines whether or not a fluctuation range W determined for power consumed by the hydrogen pump 50 is a predetermined value Wp or less, the fluctuation range being generated by opening and closing of the injector 56. In this embodiment, the predetermined value Wp is one third of a normal value of a fluctuation range determined for power consumed by the hydrogen pump 50, the fluctuation range being generated by opening and closing of the injector 56. The fluctuation range W determined for power consumed by the hydrogen pump 50 mentioned herein means a difference between power consumed before the valve of the injector 56 is opened and increased consumed power resulting from opening of the valve of the injector 56. In this embodiment, the injector 56 is opened and closed at intervals of about five milliseconds. If a state when the fluctuation range W determined for power consumed by the hydrogen pump 50 is the predetermined value Wp or less lasts for two seconds or more and this state occurs three times or more within one minute, the controller 80 determines that the fluctuation range W determined for power consumed by the hydrogen pump 50 is the predetermined value Wp or less, the fluctuation range being generated by opening and closing the injector 56.

If the controller 80 determines that the fluctuation range W determined for power consumed by the hydrogen pump 50 is the predetermined value Wp or less (step S130: YES), the controller 80 determines in step S140 that the injector 56 is failed. If the injector 56 is determined to be failed, the controller 80 outputs a result of the determination in step S150. Then, the controller 80 finishes the determination processing. In this embodiment, the controller 80 displays an indication that the injector 56 is failed on the display 95. Further, the controller 80 stores this indication into the memory 84 of the controller 80. The determination result may be output by an alternative method. For example, this indication may be given to the user through a speaker (not shown in the drawings).

If the controller 80 determines that the fluctuation range W determined for power consumed by the hydrogen pump 50 is greater than the predetermined value Wp (step S130: NO), the controller 80 determines in step S160 that the injector 56 is not failed. Then, the controller 80 finishes the determination processing.

Figure 3:
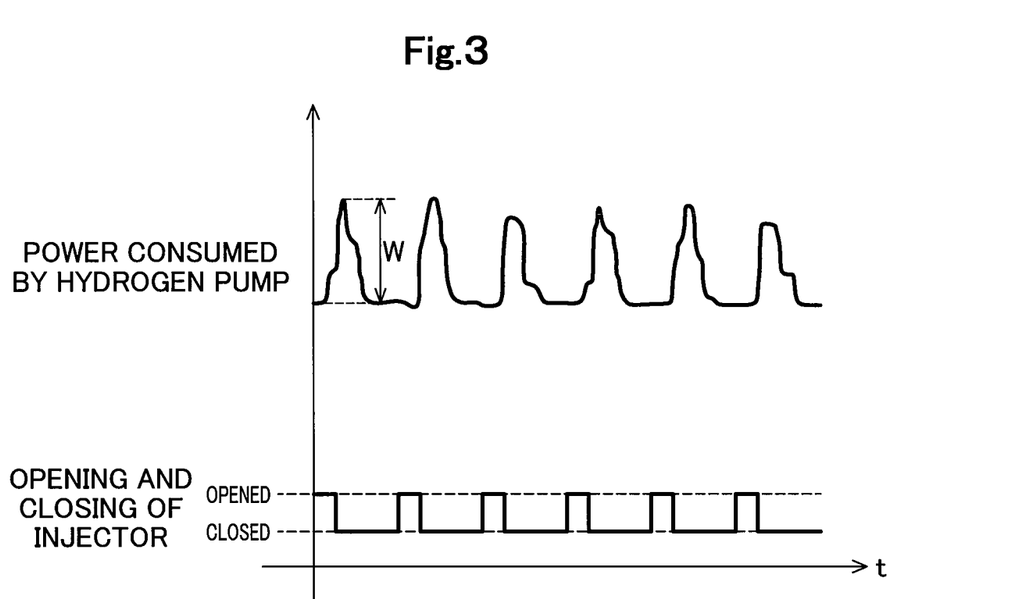
FIG. 3 shows a relationship between a fluctuation range determined for power consumed by a hydrogen pump and opening and closing of an injector.

FIG. 3 shows a relationship between the fluctuation range W determined for power consumed by the hydrogen pump 50 and opening and closing of the injector 56. Referring to FIG. 3, the horizontal axis is a time axis, and the vertical axis shows opening and closing of the injector 56 and power consumed by the hydrogen pump 50. FIG. 3 shows a state when the injector 56 is normal. If the injector 56 is normal, hydrogen gas is fed from a place upstream from the injector 56 toward a place downstream from the injector 56 by opening of the injector 56. This increases pressure in a place downstream from the injector 56 in the hydrogen gas supply flow path 32. This pressure increase increases power consumed by the hydrogen pump 50 for feeding the hydrogen gas into a place downstream from the injector 56 in the hydrogen gas supply flow path 32, thereby generating a fluctuation range for power consumed by the hydrogen pump 50. FIG. 3 shows that power consumed by the hydrogen pump 50 increases with momentary delay from opening of the injector 56.

If the injector 56 is failed, specifically, if the injector 56 is not opened even if the controller 80 gives an instruction to open the valve of the injector 56, hydrogen gas is not fed from a place upstream from the injector 56 toward a place downstream from the injector 56. Hence, no pressure increase occurs in a place downstream from the injector 56 in the hydrogen gas supply flow path 32. For this reason, no increase occurs in power consumed by the hydrogen pump 50 for feeding the hydrogen gas into a place downstream from the injector 56 in the hydrogen gas supply flow path 32. As a result, power consumed by the hydrogen pump 50 is not given a fluctuation range resulting from opening and closing of the injector 56.

In the fuel cell system 10 of the first embodiment, using a fluctuation range determined for power consumed by the hydrogen pump 50 and resulting from opening and closing of the injector 56 makes it possible to make a determination about a failure in an injector without the need of providing an additional sensor dedicated to detection of a failure in the injector.

B. Second Embodiment

B1. Fuel Cell System

Figure 4:
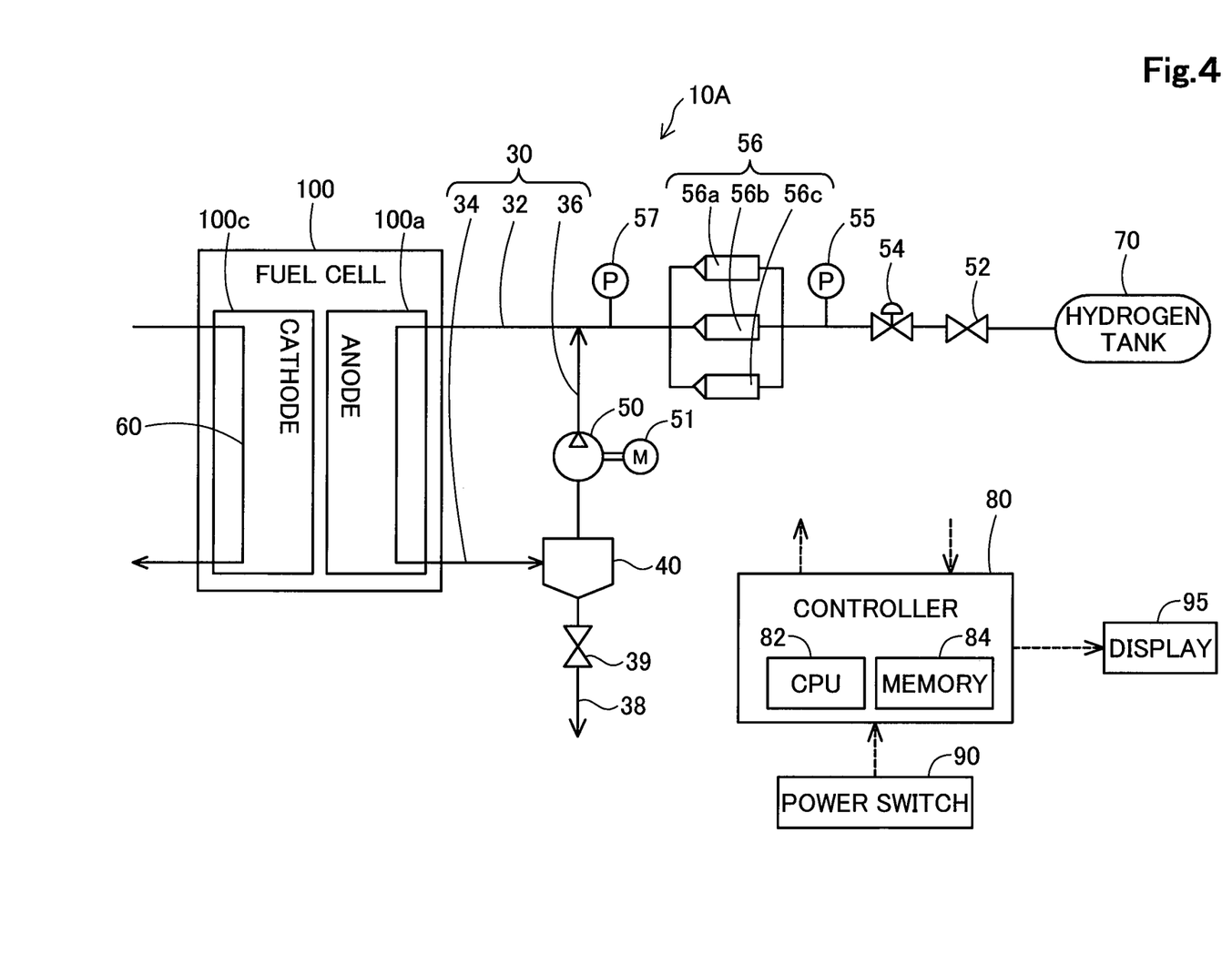
FIG. 4 is a schematic view showing a fuel cell system according to a second embodiment of the present disclosure.

FIG. 4 is a schematic view showing a fuel cell system 10A according to a second embodiment of the present disclosure. In comparison to the fuel cell system 10 of the first embodiment, the fuel cell system 10A of the second embodiment is the same as the fuel cell system 10, except that the hydrogen gas supply flow path 32 further includes: (i) a first pressure sensor 55 provided between the regulator 54 and the injector 56; and (ii) a second pressure sensor 57 provided downstream from the injector 56.

The first pressure sensor 55 is provided upstream from the injector 56 in the hydrogen gas supply flow path 32. The first pressure sensor 55 measures the pressure of hydrogen gas in a place upstream from the injector 56 in the hydrogen gas supply flow path 32. In this embodiment, the first pressure sensor 55 measures the pressure of hydrogen gas between the regulator 54 and the injector 56 in the hydrogen gas supply flow path 32. The first pressure sensor 55 is generally used for checking for leak of hydrogen gas in piping. The second pressure sensor 57 is provided downstream from the injector. 56 in the hydrogen gas supply flow path 32. The second pressure sensor 57 measures the pressure of hydrogen gas in a place downstream from the injector 56 in the hydrogen gas supply flow path 32. The second pressure sensor 57 is generally used for measuring the pressure of hydrogen gas in the fuel cell 100.

B2. Determination Method for Fuel Cell System

Figure 5:
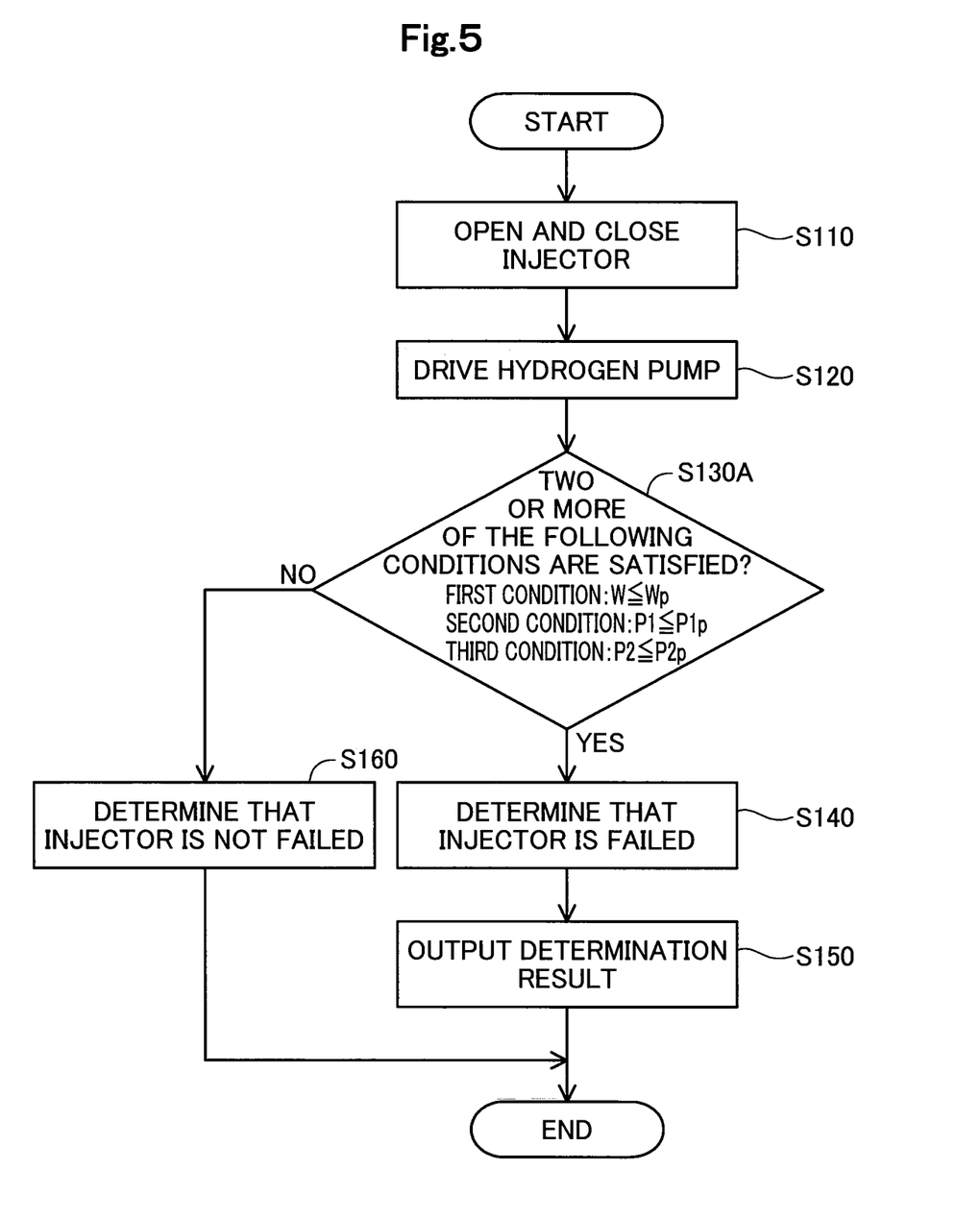
FIG. 5 is a flowchart of determination processing according to the second embodiment.

FIG. 5 is a flowchart of determination processing according to the second embodiment. In comparison to the determination processing of the first embodiment, the determination processing of the second embodiment is the same as that of the first embodiment, except that step S130A is executed instead of step S130.

In the second embodiment, the controller 80 determines in step S130A that the injector 56 is failed if two or more of three conditions described below are satisfied.

First condition: to be satisfied if the fluctuation range W determined for power consumed by the hydrogen pump 50 is the predetermined value Wp or less, the fluctuation range being generated by opening and closing of the injector 56 by the controller 80.

Second condition: to be satisfied if a fluctuation range P1 determined for pressure measured by the first pressure sensor 55 is a predetermined value P1p or less, the fluctuation range being generated by opening and closing of the injector 56 by the controller 80.

Third condition: to be satisfied if a fluctuation range P2 determined for pressure measured by the second pressure sensor 57 is a predetermined value P2p or less, the fluctuation range being generated by opening and closing of the injector 56 by the controller 80.

The first condition is the same as that used in the determination method of the first embodiment. Regarding the second condition of this embodiment, the predetermined value P1p is one third of a normal value of the fluctuation range P1 determined for pressure measured by the first pressure sensor 55, the fluctuation range being generated by opening and closing of the injector 56. The fluctuation range P1 determined for pressure measured by the first pressure sensor 55 mentioned herein means a difference between pressure measured before the valve of the injector 56 is opened and reduced pressure resulting from opening of the valve of the injector 56. Likewise, regarding the third condition of this embodiment, the predetermined value P2p is one third of a normal value of the fluctuation range P2 determined for pressure measured by the second pressure sensor 57, the fluctuation range being generated by opening and closing of the injector 56. The fluctuation range P2 determined for pressure measured by the second pressure sensor 57 mentioned herein means a difference between pressure measured before the valve of the injector 56 is opened and increased pressure resulting from opening of the valve of the injector 56.

Figure 6:
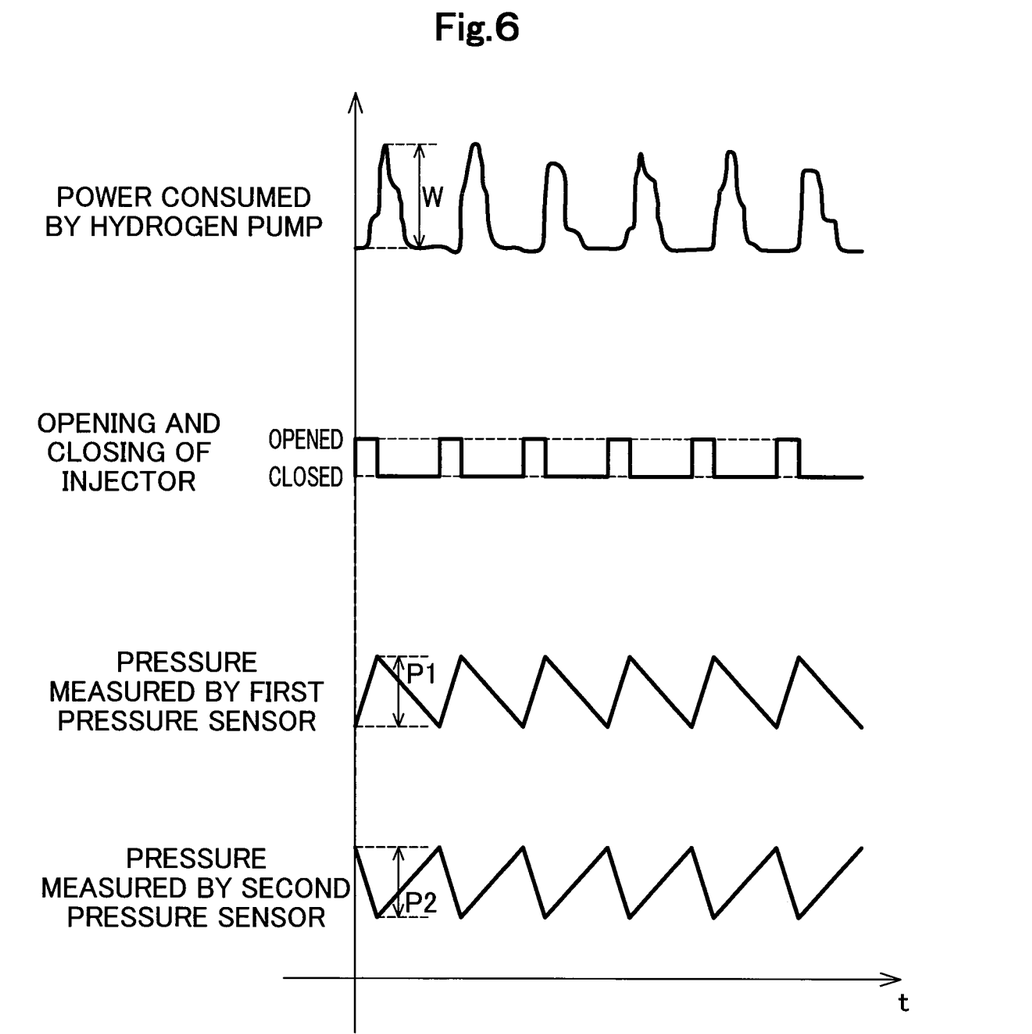
FIG. 6 shows a relationship between opening and closing of the injector and a fluctuation range determined for pressure.

FIG. 6 shows a relationship built by the fluctuation range P1 determined for pressure measured by the first pressure sensor 55 and the fluctuation range P2 determined for pressure measured by the second pressure sensor 57, in addition to the fluctuation range W determined for power consumed by the hydrogen pump 50 and opening and opening and closing of the injector 56. Referring to FIG. 6, the horizontal axis is a time axis, and the vertical axis shows the following values listed in order from the top of FIG. 6: (i) power consumed by the hydrogen pump 50; (ii) opening and closing of the injector 56; (iii) pressure measured by the first pressure sensor 55; and (iv) pressure measured by the second pressure sensor 57.

FIG. 6 shows a state when the injector 56 is normal. Like in the case of FIG. 3, if the injector 56 is normal, hydrogen gas is fed from a place upstream from the injector 56 toward a place downstream from the injector 56 by opening of the injector 56. This increases pressure in a place downstream from the injector 56 in the hydrogen gas supply flow path 32. This pressure increase increases power consumed by the hydrogen pump 50 for feeding the hydrogen gas into a place downstream from the injector 56 in the hydrogen gas supply flow path 32, thereby generating the fluctuation range W determined for power consumed by the hydrogen pump 50.

If the injector 56 is normal, hydrogen gas is fed from a place upstream from the injector 56 toward a place downstream from the injector 56 by opening of the injector 56. This reduces pressure in a place upstream from the injector 56 in the hydrogen gas supply flow path 32. This pressure reduction reduces pressure measured by the first pressure sensor 55 provided upstream from the injector 56 in the hydrogen gas supply flow path 32, thereby generating the fluctuation range P1 determined for pressure measured by the first pressure sensor 55.

Likewise, if the injector 56 is normal, hydrogen gas is fed from a place upstream from the injector 56 toward a place downstream from the injector 56 by opening of the injector 56. This increases pressure in a place downstream from the injector 56 in the hydrogen gas supply flow path 32. This pressure increase increases pressure measured by the second pressure sensor 57 provided downstream from the injector 56 in the hydrogen gas supply flow path 32, thereby generating the fluctuation range P2 determined for pressure measured by the second pressure sensor 57.

If the injector 56 is failed, specifically, if the injector 56 is not opened even if the controller 80 gives an instruction to open the valve of the injector 56, hydrogen gas is not fed from a place upstream from the injector 56 toward a place downstream from the injector 56. Hence, no pressure increase occurs in a place downstream from the injector 56 in the hydrogen gas supply flow path 32 and no pressure reduction occurs in a place upstream from the injector 56 in the hydrogen gas supply flow path 32. For this reason, no increase occurs in power consumed by the hydrogen pump 50 for feeding the hydrogen gas into a place downstream from the injector 56 in the hydrogen gas supply flow path 32. As a result, power consumed by the hydrogen pump 50 is not given a fluctuation range resulting from opening and closing of the injector 56. Likewise, each of pressure measured by the first pressure sensor 55 and pressure measured by the second pressure sensor 57 is not given a fluctuation range resulting from opening and closing of the injector 56.

Figure 7:
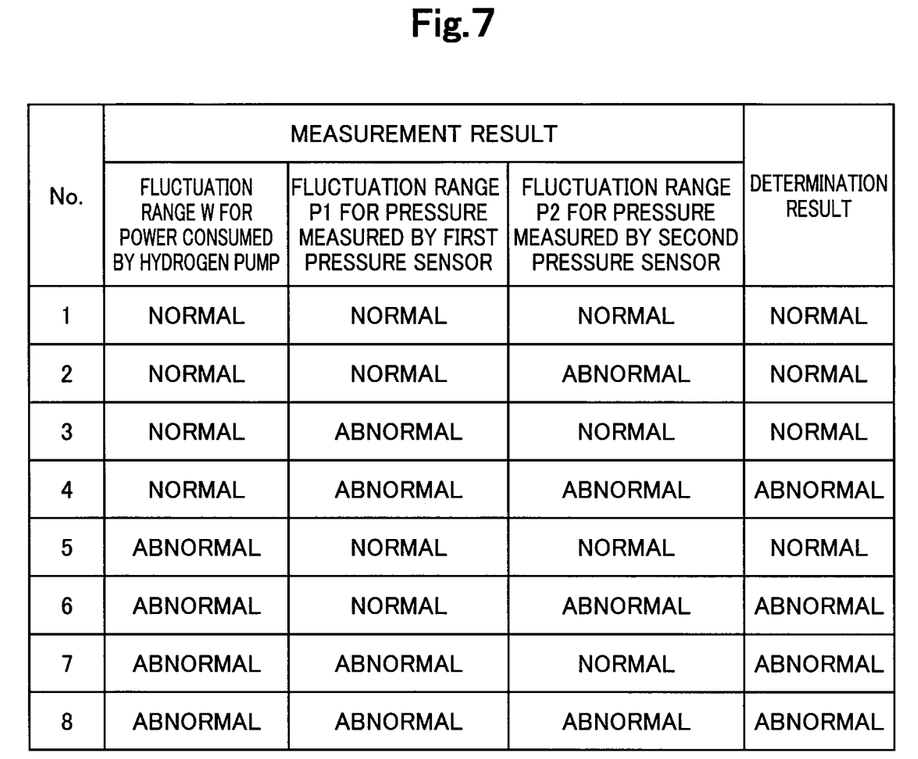
FIG. 7 shows a relationship between each of fluctuation ranges P1, and P2, and a determination result.

FIG. 7 shows a relationship between each of the fluctuation ranges W, P1, and P2, and a determination result. An item "measurement result" of FIG. 7 includes a result "normal" showing that a particular fluctuation range (fluctuation range W, for example) is greater than a predetermined value (value Wp, for example). A result "abnormal" shows that a particular fluctuation range (fluctuation range W, for example) is the predetermined value (value Wp, for example) or less. An item "determination result" of FIG. 7 includes "normal" showing that the controller 80 determines the injector 56 to be normal. A determination result "abnormal" shows that the controller 80 determines the injector 56 to be abnormal.

For example, an item No. 1 illustrated in FIG. 7 shows the following measurement results.

The fluctuation range W determined for power consumed by the hydrogen pump 50 is greater than the predetermined value Wp.

The fluctuation range P1 determined for pressure measured by the first pressure sensor 55 is greater than the predetermined value P1p.

The fluctuation range P2 determined for pressure measured by the second pressure sensor 57 is greater than the predetermined value P2p.

In this case, none of the above-described first to third conditions is satisfied. As a result, the controller 80 determines that the injector 56 is normal.

As another example, an item No. 4 illustrated in FIG. 7 shows the following measurement results:

The fluctuation range W determined for power consumed by the hydrogen pump 50 is greater than the predetermined value Wp.

The fluctuation range P1 determined for pressure measured by the first pressure sensor 55 is the predetermined value P1p or less.

The fluctuation range P2 determined for pressure measured by the second pressure sensor 57 is the predetermined value P2p or less.

In this case, the above-described first condition is not satisfied, whereas the above-described second and third conditions are satisfied. This means that two of the three conditions are satisfied, so that the controller 80 determines that the injector 56 is abnormal.

In the fuel cell system 10A of the second embodiment, using the above-described phenomena makes it possible to determine a failure in an injector even if at least one of the hydrogen pump 50, the first pressure sensor 55, and the second pressure sensor 57 is failed. Further, the fuel cell system 10A of the second embodiment makes a determination based on the three fluctuation ranges W, P1, and P2, thereby increasing determination accuracy.

C. Third Embodiment

Figure 8:
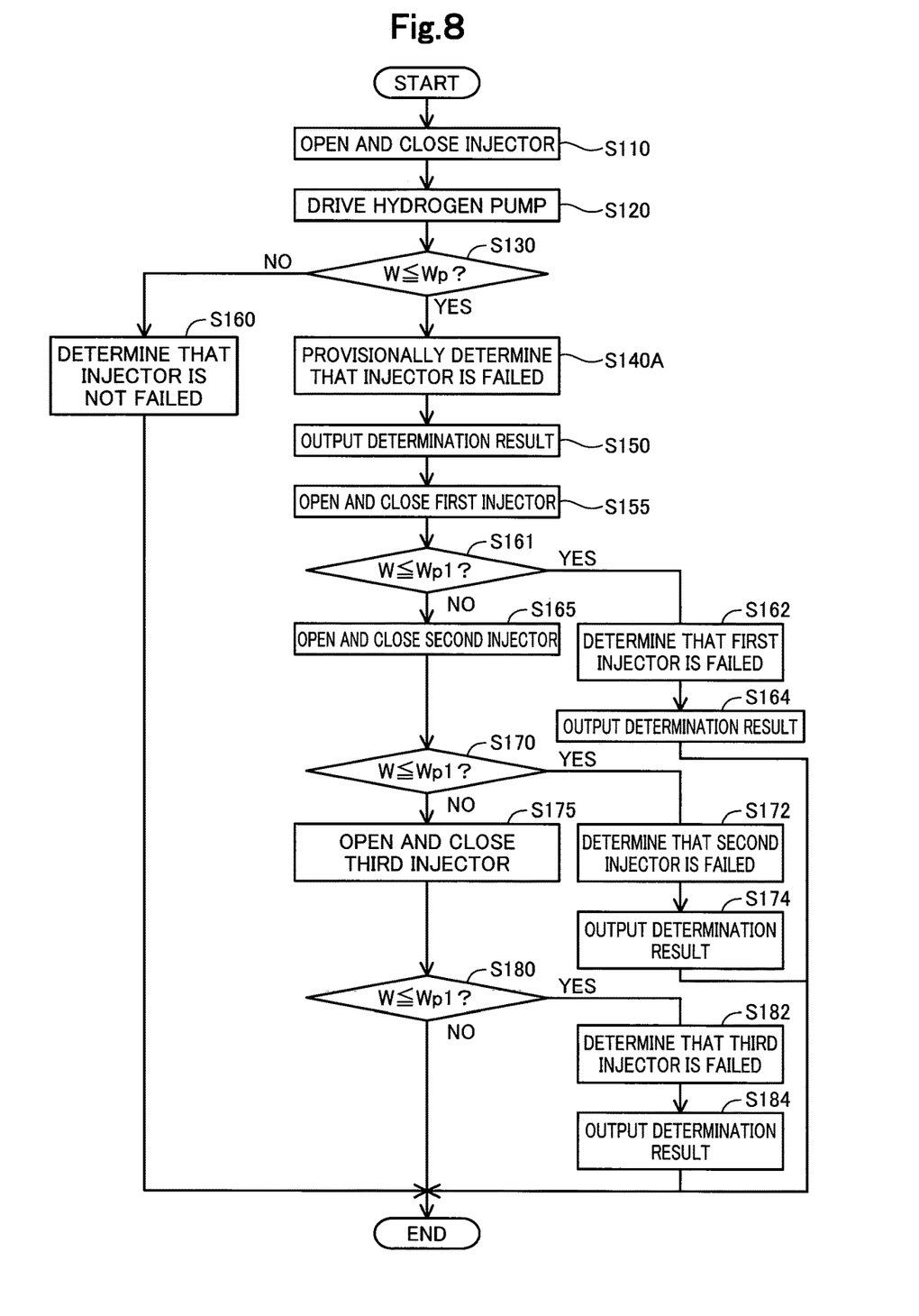
FIG. 8 is a flowchart of determination processing according to a third embodiment.

FIG. 8 is a flowchart of determination processing according to a third embodiment. In comparison to the determination processing of the first embodiment, the determination processing of the third embodiment is the same as that of, the first embodiment, except that it includes step S140A instead of step S140 and further includes step S155 and its subsequent steps. In the first embodiment, a determination about a failure is made in terms of the three injectors 56 as a whole. In the third embodiment, a determination about a failure is made in terms of each of the three injectors 56.

In the third embodiment, if the controller 80 determines that the fluctuation range W determined for power consumed by the hydrogen pump 50 is the predetermined value Wp or less (step S130: YES), the controller 80 makes a provisional determination that the injector 56 is failed in step S140A. Then, the controller 80 outputs a result of the provisional determination in step S150. The provisional determination about the failure in the injector 56 mentioned herein means an indication that one of all the injectors 56 may be failed. The controller 80 outputs a result of the provisional determination by storing this indication into the memory 84 of the controller 80.

After step S150, the controller 80 opens and closes only the first injector 56a of the injectors 56 (step S155).

Then, the controller 80 determines whether or not the fluctuation range W determined for power consumed by the hydrogen pump 50 is a predetermined value Wp1 or less (step S161). The fluctuation range W of the first embodiment results from opening and closing of all the injectors 56a to 56c. In contrast, the fluctuation range W of the third embodiment results from opening and closing of only one of all the injectors 56a to 56c (first injector 56a, for example). Thus, the fluctuation range W of the third embodiment shows a value smaller than the value of the fluctuation range W of the first embodiment. The predetermined value Wp1 is one third of a normal value of the fluctuation range W determined for power consumed by the hydrogen pump 50, the fluctuation range being generated by opening and closing of the first injector 56a. During execution of steps S155 and S161, the controller 80 exerts control so as to close the second injector 56b and the third injector 56c.

If the controller 80 determines that the fluctuation range W determined for power consumed by the hydrogen pump 50 is the predetermined value Wp1 or less (step S161: YES), the controller 80 determines in step S162 that the first injector 56a is failed and outputs a result of the determination in step S164. Then, the controller 80 finishes the determination processing. The controller 80 outputs a result of the determination by displaying an indication that the first injector 56a is failed on the display 95 and storing this indication into the memory 84 of the controller 80.

If the controller 80 determines that the fluctuation range W determined for power consumed by the hydrogen pump 50 is greater than the predetermined value Wp1 (step S161: NO), the controller 80 opens and closes only the second injector 56b of the injectors 56 (step S165).

Then, the controller 80 determines whether or not the fluctuation range W determined for power consumed by the hydrogen pump 50 is the predetermined value Wp1 or less (step S170). During execution of steps S165 and S170, the controller 80 exerts control so as to close the first injector 56a and the third injector 56c.

If the controller 80 determines that the fluctuation range W determined for power consumed by the hydrogen pump 50 is the predetermined value Wp1 or less (step S170: YES), the controller 80 determines in step S172 that the second injector 56b is failed and outputs a result of the determination in step S174. Then, the controller 80 finishes the determination processing. The controller 80 outputs a result of the determination by displaying an indication that the second injector 56b is failed on the display 95 and storing this indication into the memory 84 of the controller 80.

If the controller 80 determines that the fluctuation range W determined for power consumed by the hydrogen pump 50 is greater than the predetermined value Wp1 (step S170: NO), the controller 80 opens and closes only the third injector 56c of the injectors 56 (step S175).

Then, the controller 80 determines whether or not the fluctuation range W determined for power consumed by the hydrogen pump 50 is the predetermined value Wp1 or less (step 180). During execution of steps S175 and S180, the controller 80 exerts control so as to close the first injector 56a and the second injector 56b.

If the controller 80 determines that the fluctuation range W determined for power consumed by the hydrogen pump 50 is the predetermined value Wp1 or less (step S180: YES), the controller 80 determines in step S182 that the third injector 56c is failed and outputs a result of the determination in step S184. Then, the controller 80 finishes the determination processing. The controller 80 outputs a result of the determination by displaying an indication that the third injector 56c is failed on the display 95 and storing this indication into the memory 84 of the controller 80.

If the controller 80 determines that the fluctuation range W determined for power consumed by the hydrogen pump 50 is greater than the predetermined value Wp1 (step S180: NO), the controller 80 finishes the determination processing.

The determination processing of the third embodiment makes it possible to make a determination on each of the three injectors 56 about the presence or absence of a failure.

D. Fourth Embodiment

A determination to be made in the above-described embodiments is only about the presence or absence of a failure in the injector A fourth embodiment is to determine the presence or absence of a failure in each of the hydrogen pump 50, the first pressure sensor 55, and the second pressure sensor 57 in addition to the presence or absence of a failure in the injector 56.

Figure 9:
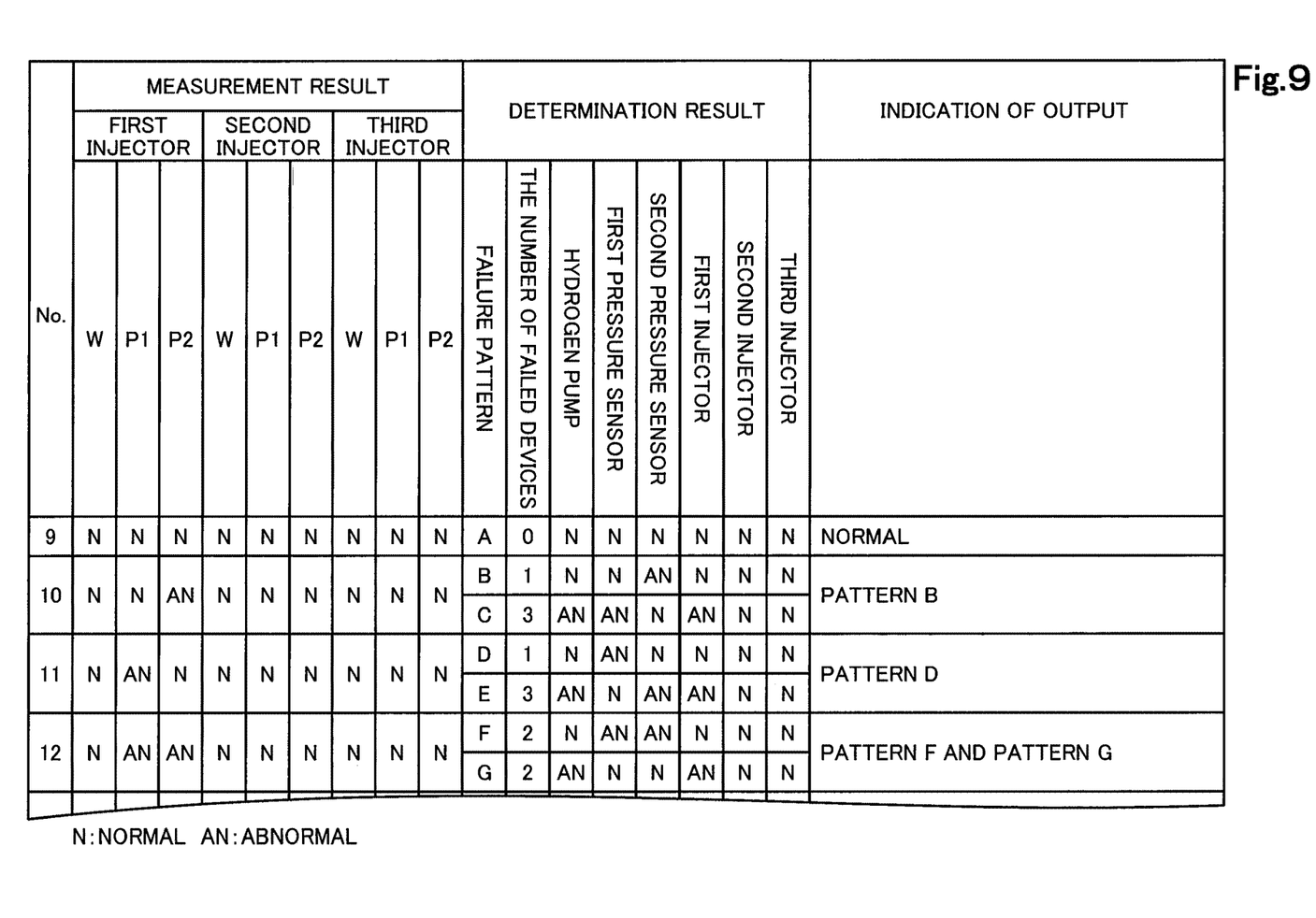
FIG. 9 explains failure determinations made by using a hydrogen pump, etc.

FIG. 9 explains a determination about the presence or absence of a failure in each of the hydrogen pump 50, the first pressure sensor 55, and the second pressure sensor 57 in addition to a determination about the presence or absence of a failure in the injector 56. In this example, the injectors 56a to 56c are opened and closed individually one by one to obtain a measurement result based on a fluctuation range resulting from opening and closing of each injector. Referring to FIG. 9, a "normal state" is shown as "normal" and an abnormal state is shown as "abnormal." A measurement result showing "normal" means that a fluctuation range (fluctuation range W, for example) resulting from opening and closing of a particular injector (first injector 56a, for example) is greater than a predetermined value (value Wp1, for example). A measurement result showing "abnormal" means that fluctuation range (fluctuation range W, for example) resulting from opening and closing of a particular injector (first injector 56a, for example) is the predetermined value (value Wp1, for example) or less.

FIG. 9 shows a determination result about each device obtained by measuring the following values resulting from opening and closing of each of the injectors 56a and 56c: (i) the fluctuation range W determined for power consumed by the hydrogen pump 50; (ii) the fluctuation range P1 determined for pressure measured by the first pressure sensor 55; and (iii) the fluctuation range P2 determined for pressure measured by the second pressure sensor 57. A determination result shown in FIG. 9 includes the following results: (i) "failure pattern" showing a pattern of a combination of devices including a device considered to be failed; (ii) "the number of failed devices" showing the number of devices considered to be failed; and a determination result about the presence or absence of a failure in each device. These determination results include not only a determination result about each of the injectors 56 but also include a determination result about each of the hydrogen pump 50, the first pressure sensor 55, and the second pressure sensor 57.

For example, an item No. 9 illustrated in FIG. 9 shows that all the following values resulting from opening and closing of each of the injectors 56a and 56c are normal: (i) the fluctuation range W determined for power consumed by the hydrogen pump 50; (ii) the fluctuation range P1 determined for pressure measured by the first pressure sensor 55: and (iii) the fluctuation range P2 determined for pressure measured by the second pressure sensor 57. Thus, determination results made in this case show that the injectors 56a to 56c, the hydrogen pump 50, the first pressure sensor 55, and the second pressure sensor 57 are all normal.

An item No. 10 illustrated in FIG. 9 shows that the fluctuation range P2 determined for pressure measured by the second pressure sensor 57 resulting from opening and closing of the first injector 56a is abnormal, and the values except the fluctuation range P2 are normal. In this case, the following two patterns are thinkable as determination results.

According to a pattern B as one of these patterns, only the second pressure sensor 57 is abnormal and the other devices are normal. These results are derived from the following idea. The first injector 56a is determined to be normal based on results about the fluctuation range W determined for power consumed by the hydrogen pump 50 and the fluctuation range P1 determined for pressure measured by the first pressure sensor 55. Thus, according to the pattern B, the first injector 56a is determined to be normal. As a result, according to the pattern B, the second pressure sensor 57 is determined to be abnormal based on which the first injector 56a has been determined to be abnormal, contrary to its determination of being normal.

According to a pattern C as the other pattern, the hydrogen pump 50, the first pressure sensor 55, and the first injector 56a are abnormal, whereas the other devices are normal. These results are derived from the following idea. The first injector 56a is determined to be abnormal based on a result about the fluctuation range P2 determined for pressure measured by the second pressure sensor 57. Thus, according to the pattern C, the first injector 56a is determined to be abnormal. As a result, according to the pattern C, the hydrogen pump 50 and the first pressure sensor 55 are determined to be abnormal based on which the first injector 56a has been determined to be normal, contrary to its determination of being abnormal. According to the pattern C, the second pressure sensor 57 is determined to be normal based on which the first injector 56a has been determined to be abnormal, like its determination of being abnormal. Thus, according to the pattern C, the second injector 56b and the third injector 56c are both determined to be normal based on which the second pressure sensor 57 has been determined to be normal.

According to the pattern B, "the number of failed devices" is one as only the second pressure sensor 57 is a failed device. According to the pattern C, "the number of failed devices" is three as the hydrogen pump 50, the first pressure sensor 55, and the second pressure sensor 57 are failed devices. The probability of generation of a pattern is reduced as the number of failed devices according to this pattern increases. Thus, the pattern B of a smaller number of failed devices is determined to be generated, and an indication of the generation of the pattern B is output. If there are multiple thinkable failure patterns and there are also two or more patterns showing the smallest number of failed devices among the multiple failure patterns, all these patterns showing the smallest number of failed devices are output.

The fourth embodiment makes it possible to determine the presence or absence of a failure in each of the three injectors 56. The fourth embodiment further makes possible to determine whether or not the injector 56 is failed, even if any one of the hydrogen pump 50, the first pressure sensor 55, and the second pressure sensor 57 is failed. The fourth embodiment still makes it possible to make the following determinations separately: a determination about abnormality of each of the hydrogen pump 50, the first pressure sensor 55, and the second pressure sensor 57; and a determination about whether or not the injector 56 is failed.

E. Modifications

E1. First Modification

In the above-described embodiments, the determination processing is executed if a user sets the power switch 90 ON, to which the present disclosure is not limited. The determination processing may be executed in either of the following ways: (i) after a lapse of a predetermined period (10 minutes, for example) after the user sets the power switch 90 ON; and (ii) after the user sets the power switch 90 OFF. If the fuel cell system is installed on a vehicle, the determination processing may be executed while the vehicle is traveling at a low speed (30 km per hour or less, for example). To execute the determination processing while the vehicle is traveling, the controller 80 calculates a target value of the number of rotations of the hydrogen pump 50 based on the speed of the vehicle, and controls the hydrogen pump 50 so as to achieve the target value. Then, the controller 80 executes the determination processing using power consumed by the hydrogen pump 50 being driven.

The determination processing may be executed after failure information about a different device stored in advance in the memory 84 is acquired. By doing so, if information indicating that the first injector 56a is failed is already stored in the memory 84, for example, a determination about whether or not the first injector 56a is failed becomes omissible. Failure information about a different device may be information about a break or a short-circuit occurring in the hydrogen pump 50, the first pressure sensor 55, or the second pressure sensor 57, for example.

E2. Second Modification

In the above-described embodiments, the controller 80 controls the injector 56 and determines whether or not the injector 56 is failed, to which the present disclosure is not limited. For example, while the controller 80 controls the injector 56, a determination part provided separately from the controller 80 may be responsible for determining whether or not the injector 56 is failed.

E3. Third Modification

In the above-described embodiments, the presence of a failure in the injector 56 means that the injector 56 is not opened even if the controller 80 gives an instruction to open the valve of the injector 56, to which the present disclosure is not limited. The presence of a failure in the injector 56 may also mean that the injector 56 is not closed even if the controller 80 gives an instruction to close the valve of the injector 56, and the present disclosure is also applicable to this case.

E4. Fourth Modification

In the second embodiment, the injector 56 is determined to be failed if two or more of the above-described three conditions are satisfied. Alternatively, the injector 56 may be determined to be failed only if all of the three conditions are satisfied. Likewise, each of the injectors 56a to 56c may be determined to be failed if two or more of the three conditions are satisfied. Alternatively, each of the injectors 56a to 56c may be determined to be failed only if all of the three conditions are satisfied. Determination accuracy is increased by determining that each of the injectors 56a to 56c is failed only if all of the three conditions are satisfied.

E5. Fifth Modification

In the above-described embodiments, a power meter is used as the consumed power acquiring part 51, to which the present disclosure is not limited. For example, for calculation of power consumed by the hydrogen pump 50, an ammeter for measuring the value of a current flowing in the hydrogen pump 50 or a thermometer for measuring the temperature of cooling water for cooling the hydrogen pump 50 is available as the consumed power acquiring part 51.

The present disclosure is not limited to the above-described embodiments or modifications but is feasible in the form of various configurations within a range not deviating from the substance of the disclosure. For example, technical features in the embodiments corresponding to those in each of the aspects described in SUMMARY can be replaced or combined, where appropriate, with the intention of solving some or all of the aforementioned problems or achieving some or all of the aforementioned effects. Unless being described as absolute necessities in this specification, these technical features may be deleted, where appropriate. For example, the present disclosure may be implemented by aspects described below.

(1) According to one aspect of the present disclosure, a fuel cell system is provided. The fuel cell system comprises: a hydrogen gas supply flow path configured to supply hydrogen gas to the fuel cell stack; a hydrogen gas discharge flow path configured to discharge the hydrogen gas from the fuel cell stack; a hydrogen gas circulation flow path configured to communicate the hydrogen gas supply flow path and the hydrogen gas discharge flow path with each other; an injector provided in the hydrogen gas supply flow path at an upstream of a connection between the hydrogen gas supply flow path and the hydrogen gas circulation flow path; a hydrogen pump provided in the hydrogen gas circulation flow path; a consumed power acquiring part configured to acquire a consumed power consumed by the hydrogen pump; and a controller configured to control at least the injector and the hydrogen pump. The controller is further configured to determine whether or not a fluctuation range of the consumed power of the hydrogen pump caused by opening and closing of the injector is a predetermined value or less, and to determine whether or not the injector is failed using a determination result regarding the fluctuation range. According to the fuel cell system of this aspect, using the fluctuation range determined for power consumed by the hydrogen pump makes it possible to make a determination about a failure in the injector without the need of providing an additional sensor dedicated to detection of a failure in the injector.

(2) The fuel cell system of the above-described aspect may further comprise: a first pressure sensor provided upstream from the injector in the hydrogen gas supply flow path and configured to measure a hydrogen gas pressure; and a second pressure sensor provided downstream from the injector in the hydrogen gas supply flow path and configured to measure the hydrogen gas pressure. The controller may be configured to determine that the injector is failed if a first condition is satisfied and at least one of a second condition and a third condition is satisfied, the first condition is satisfied if the fluctuation range of the consumed power of the hydrogen pump is the predetermined value or less, the second condition is satisfied if a fluctuation range of the pressure caused by opening and closing of the injector measured by the first pressure sensor is a second predetermined value or less, and the third condition is satisfied if a fluctuation range of the pressure measured by the second pressure sensor caused by opening and closing of the injector is a third predetermined value or less. The fuel cell system of this aspect is capable of detecting a failure in the injector even if at least one of the hydrogen pump, the first pressure sensor, and the second pressure sensor is failed.

The present disclosure is feasible as various aspects. For example, the present disclosure is feasible as a determination method for the fuel cell system, a vehicle including the fuel cell system, etc.

What is claimed is:
1. A fuel cell system comprising:
a fuel cell stack;
a hydrogen gas supply flow path configured to supply hydrogen gas to the fuel cell stack;
a hydrogen gas discharge flow path configured to discharge the hydrogen gas from the fuel cell stack;
a hydrogen gas circulation flow path configured to communicate the hydrogen gas supply flow path and the hydrogen gas discharge flow path with each other;
an injector provided in the hydrogen gas supply flow path at a position upstream from a connection between the hydrogen gas supply flow path and the hydrogen gas circulation flow path;
a hydrogen pump provided in the hydrogen gas circulation flow path;
a consumed power acquiring part configured to acquire a consumed power consumed by the hydrogen pump; and
a controller configured to control at least the injector and the hydrogen pump, wherein the controller is further configured to:
determine whether or not a fluctuation range of the consumed power of the hydrogen pump after giving an opening and closing instruction to the injector is a predetermined value or less,
determine whether or not the injector is failed using a determination result regarding the fluctuation range, and
if the injector is determined to be failed, output an indication regarding a failure of the injector.

2. The fuel cell system in accordance with claim 1, further comprising:
a first pressure sensor provided upstream from the injector in the hydrogen gas supply flow path and configured to measure a hydrogen gas pressure; and
a second pressure sensor provided downstream from the injector in the hydrogen gas supply flow path and configured to measure the hydrogen gas pressure, wherein
the controller is configured to determine that the injector is failed if a first condition is satisfied and at least one of a second condition and a third condition is satisfied,
the first condition is satisfied if the fluctuation range of the consumed power of the hydrogen pump is the predetermined value or less,
the second condition is satisfied if a fluctuation range of the pressure measured by the first pressure sensor after giving the opening and closing instruction to the injector is a second predetermined value or less, and
the third condition is satisfied if a fluctuation range of the pressure measured by the second pressure sensor after giving the opening and closing instruction to the injector is a third predetermined value or less.

3. The fuel cell system in accordance with claim 1, further comprising:
a first pressure sensor provided upstream from the injector in the hydrogen gas supply flow path and configured to measure a hydrogen gas pressure; and
a second pressure sensor provided downstream from the injector in the hydrogen gas supply flow path and configured to measure the hydrogen gas pressure, wherein
the controller is configured to determine that the injector is failed if a second condition and third condition are satisfied, irrespective of whether or not a first condition is satisfied,
the first condition is satisfied if the fluctuation range of the consumed power of the hydrogen pump is the predetermined value or less,
the second condition is satisfied if a fluctuation range of the pressure measured by the first pressure sensor after giving the opening and closing instruction to the injector is a second predetermined value or less, and
the third condition is satisfied if a fluctuation range of the pressure measured by the second pressure sensor after giving the opening and closing instruction to the injector is a third predetermined value or less.

4. A determination method for a fuel cell system, wherein the fuel cell system comprises:
a hydrogen gas supply flow path configured to supply hydrogen gas to a fuel cell stack;
a hydrogen gas discharge flow path configured to discharge the hydrogen gas from the fuel cell stack;
a hydrogen gas circulation flow path configured to communicate the hydrogen gas supply flow path and the hydrogen gas discharge flow path with each other;
an injector provided in the hydrogen gas supply flow path at a position upstream from a connection between the hydrogen gas supply flow path and the hydrogen gas circulation flow path;
a hydrogen pump provided in the hydrogen gas circulation flow path; and a consumed power acquiring part configured to acquire a consumed power consumed by the hydrogen pump, and wherein the determination method comprises:

determining whether or not a fluctuation range of the consumed power of the hydrogen pump after giving an opening and closing instruction to the injector is a predetermined value or less, determining whether or not the injector is failed using a determination result regarding the fluctuation range, and if the injector is determined to be failed, outputting an indication regarding a failure of the injector.

5. The determination method for the fuel cell system in accordance with claim 4, wherein the fuel cell system further comprises:

a first pressure sensor provided upstream from the injector in the hydrogen gas supply flow path and configured to measure a hydrogen gas pressure; and a second pressure sensor provided downstream from the injector in the hydrogen gas supply flow path and configured to measure the hydrogen gas pressure, and wherein the determination method comprises:

determining if a first condition is satisfied and if at least one of a second condition or a third condition is satisfied, wherein the first condition is satisfied if the fluctuation range of the consumed power of the hydrogen pump is the predetermined value or less, the second condition is satisfied if a fluctuation range of the pressure measured by the first pressure sensor after giving the opening and closing instruction to the injector is a second predetermined value or less, and the third condition is satisfied if a fluctuation range of the pressure measured by the second pressure sensor after giving the opening and closing instruction to the injector is a third predetermined value or less; and determining that the injector is failed if the first condition is satisfied and at least one of the second condition or the third condition is satisfied.

6. The determination method for the fuel cell system in accordance with claim 4, wherein the fuel cell system further comprises:

a first pressure sensor provided upstream from the injector in the hydrogen gas supply flow path and configured to measure a hydrogen gas pressure; and a second pressure sensor provided downstream from the injector in the hydrogen gas supply flow path and configured to measure the hydrogen gas pressure, and wherein the determination method comprises:

determining if a second condition and third condition are satisfied, irrespective of whether or not a first condition is satisfied, wherein the first condition is satisfied if the fluctuation range of the consumed power of the hydrogen pump is the predetermined value or less, the second condition is satisfied if a fluctuation range of the pressure measured by the first pressure sensor after giving the opening and closing instruction to the injector is a second predetermined value or less, and the third condition is satisfied if a fluctuation range of the pressure measured by the second pressure sensor after giving the opening and closing instruction to the injector is a third predetermined value or less; and determining that the injector is failed if the second condition and third condition are satisfied, irrespective of whether or not the first condition is satisfied.

* * * * *